United States Patent Office 3,754,008
Patented Aug. 21, 1973

3,754,008
DYES OF THE PYRANTHRONE SERIES
Fritz Graser, Ludwigshafen, Germany, assignor to Badische Anilin- & Soda-Fabrik Aktiengesellschaft, Ludwigshafen (Rhine), Germany
No Drawing. Filed Apr. 5, 1971, Ser. No. 131,402
Claims priority, application Germany, Apr. 11, 1970,
P 20 17 450.9
Int. Cl. C09b 3/42
U.S. Cl. 260—360      2 Claims

ABSTRACT OF THE DISCLOSURE

New dyes having the formula:

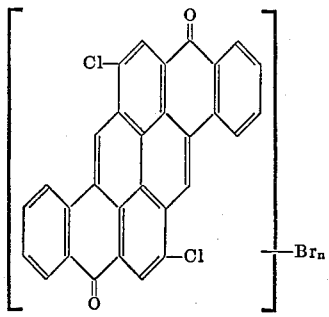

where $n$ denotes a value from 0.1 to 2.5. The dyes have excellent fastness properties including light fastness and fastness to weather.

---

This invention relates to bromination products of 6,14-dichlorpyranthrone which are outstandingly suitable as dyes, and to the production and use of these dyes.

The new dyes having the formula:

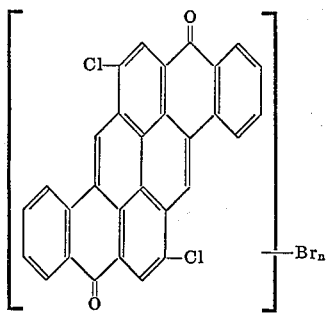

where $n$ denotes a value of from 0.1 to 2.5, preferably from 0.5 to 2.2, have excellent fastness properties, in particular outstanding fastness to light and weather, and high solvent and migration fastness.

The new dyes are obtained by bromination of 6,14-dichloropyranthrone. 6,14 - dichloropyranthrone and the production of the same are the subject of U.S. application Ser. No. 115,826, filed Feb. 16, 1971. Bromination is advantageously carried out in a strong mineral acid such as sulfuric acid, for example 10 to 100% by weight sulfuric, hydrochloric acid such as 10 to 40% by weight hydrochloric acid, or in weak or medium strength oleum such as oleum having a content of up to 15% by weight of $SO_3$. Chlorosulfonic acid is particularly suitable as the reaction medium. The amount of strong mineral acid used as solvent or diluent may vary within wide limits and may be for example from five to one hundred times the amount of 6,14-dichloropyranthrone used. It is advantageous to keep the amount of solvent or diluent as low as possible, for example from five to ten times. The lower limit to the amount of solvent or diluent is determined by the fact that the mixture of 6,14-dichloropyranthrone and the solvent or diluent should be stirrable and should remain stirrable in the reaction. This is the case with more than five times the amount. It is convenient to use conventional halogenation catalysts such as antimony and particularly iodine and sulfur for the bromination. The amount of catalyst may also vary within wide limits and advantageously catalytic amounts such as from 1 to 10% by weight with reference to 6,14-dichloropyranthrone are used. The amount of bromine used determines the degree of bromination. It may vary from the equivalent amount up to a large excess. It is advantageous to use an amount of from 35 to 100% of bromine with reference to the 6,14-dichloropyranthrone used.

The reaction temperature also influences the course of the bromination. It may be from 0° C. to an elevated temperature such as 100° C. It is advantageous to choose a temperature between room temperature (20° to 25° C.) and 70° to 80° C. The reaction period is selected so that either no further absorption of bromine takes place or the desired degree of bromination is reached. It may be for example from one hour to twenty-four hours.

The course of the bromination is dependent not only on the type of solvent or diluent and the type of catalyst but also on the amount of bromine used, the reaction temperature and the reaction period.

The shades of color obtained are similarly dependent and are between a reddish yellow and red with increasing bromine content.

Isolation of the dye obtained is effected by filtering it off if it has been prepared in aqueous acid (in which it is practically insoluble) or by slowly adding water until the dye crystallizes from the reaction solution (when concentrated acids such as concentrated sulfuric acid, oleum or chlorosulfonic acid are used) followed by filtration and washing with water, or most advantageously and conveniently the whole reaction mixture is precipitated using ice, water or a mixture of ice and water, filtered and washed until neutral. The precipitation temperature may be between 0° C. and a higher temperature, for example 80° C. to 90° C. The isolated dyes are in a very pure form and require no further purification prior to use. As pigment dyes they have excellent fastness to light and weather and very high resistance to solvents and overspraying; they are also suitable as vat dyes because of their good fastness properties and their clear shade.

Prior art bromination products of unsubstituted pyranthrone such as the di-bis-tetrabromopyranthrone derivatives described in FIAT Final Report 1313, II, page 117 and German patent specifications Nos. 563,997 and 218,162 exhibit inferior solvent and migration fastness as pigment dyes and darken so much upon exposure to light and weathering that they cannot be used as pigments without further treatment. It is only by expensive purification treatments, such as extraction with hot solvents or fractionation from concentrated sulfuric acid, that these important fastness properties can be improved somewhat, but without the fastness requirements being fully met thereby. When the said bromination products of unsubstituted pyranthrone are used as vat dyes they dye in much duller shades than the new dyes, which give bright orange shades.

Aqueous dye pastes obtained in the production of the new dyes may be used immediately for the production of a great variety of pigment preparations, e.g. aqueous or anhydrous preparations such as are obtained by flushing for example.

The aqueous filtered material obtained in the production may also be dried and brought into finely divided form by conventional methods, for example by grinding with or without the addition or grinding aids such as salts, solvents or diluents. The ground material or advantageously the aqueous filtered material which is obtained in finely divided form in the synthesis may be aftertreated, for example at elevated temperature or under pressure, in aqueous suspension or in an organic solvent or in a water-miscible organic diluent mixed with water. Special pigment finishes are thus obtained.

The dyes according to the invention may be used as pigment dyes, for example for coloring printing inks, distempers or coating materials of all types such as nitrocellulose varnish, or for mass coloration of plastics, particularly of polyvinyl chloride containing plasticizer, of polyethylene, polystyrene, or polypropylene. They are also very suitable as dope dyes for a great variety of materials such as polyvinyl chloride, polyacrylonitrile, copolymers of acrylonitrile with other vinyl compounds, polyamides, cellulose acetate, secondary cellulose acetate or regenerated cellulose. Moreover the new dyes may be used as vat dyes.

The invention is illustrated by the following examples in which parts and percentages are by weight.

EXAMPLE 1

50 parts of 6,14-dichloropyranthrone (obtainable according to U.S. application Ser. No. 115,826, filed Feb. 16, 1971) and 2.5 parts of sulfur are introduced into 400 parts of chlorosulfonic acid at room temperature. 50 parts of bromine is added, the whole is heated to 30° C. in the course of one hour, kept at this temperature for one hour, heated within another two hours to 65° C. to 70° C. and kept at this temperature for four hours. The reaction mixture is allowed to cool to ambient temperature and then poured onto about 7000 parts of a mixture of ice and water, and the precipitate is filtered and washed with water until neutral. A very good yield of a yellowish red pigment dye is obtained in finely divided paste form (about 15% dye content); it has excellent fastness to light and weather and very good fastness to solvents and overspraying. As a vat dye, it dyes cotton brilliant orange shades having very good fastness properties. The dye has an average of about 2.2 atoms of bromine per molecule.

EXAMPLE 2

The procedure of Example 1 is repeated but after adding the bromine the whole is heated to 55° to 60° C. in the course of forty-five minutes, kept for two hours at this temperature and then worked up immediately. A very good yield of a yellowish red pigment dye is obtained which has very good fastness properties. The dye has an average of about 2.1 atoms of bromine in the molecule.

EXAMPLE 3

50 parts of 6,14-dichloropyranthrone and 2 parts of sulfur are introduced into 400 parts of chlorosulfonic acid at about 10° C. 17.5 parts of bromine is added and the further procedure is as described in Example 1. A very good yield of a yellowish red pigment dye is obtained which has very good fastness to light, weather, solvents and overspraying. The dye has an average of about 1.9 atoms of bromine per molecule.

EXAMPLE 4

50 parts of 6,14-dichloropyranthrone and 2 parts of sulfur are introduced at about 10° C. into 400 parts of chlorosulfonic acid. 50 parts of bromine is added and the whole is kept for seven hours at 30° C. and fifteen hours at ambient temperature. The product is worked up as described in Example 1 and a very good yield of a yellowish red pigment dye is obtained which has very good fastness properties, especially excellent fastness to solvents. The dye has an average of about 1.5 atoms of bromine in the molecule.

EXAMPLE 5

50 parts of 6,14-dichloropyranthrone and 2.5 parts of sulfur are introduced into 400 parts of chlorosulfonic acid at ambient temperature. 50 parts of bromine is added and the whole is stirred for seven hours at about 30° C. and then for twelve hours at ambient temperature. The product is worked up as described in Example 1. A very good yield of a yellowish red pigment dye is obtained which has very good fastness properties. The dye has an average of about 1.5 atoms of bromine in the molecule.

EXAMPLE 6

50 parts of 6,14-dichloropyranthrone and 1 part of iodine are introduced into 400 parts of chlorosulfonic acid about 10° C. 17.5 parts of bromine is added and the whole is heated to 55° to 60° C. within forty-five minutes, kept at this temperature for two hours and worked up as described in Example 1. A very good yield of a yellowish red pigment dye is obtained which has very good fastness properties. The dye has about 1 bromine atom in the molecule.

EXAMPLE 7

The procedure of Example 3 is repeated but the whole is not heated at 55° to 60° C., but kept for seven hours at 30° C. and then for fifteen hours at ambient temperature. A very good yield of a reddish orange pigment dye is obtained having very good fastness to solvents. The dye has an average of about 0.5 atom of bromine in the molecule. When used as a vat dye it dyes cotton very bright orange shades having very good fastness properties.

EXAMPLE 8

50 parts of 6,14-dichloropyranthrone and 1 part of iodine are introduced into 400 parts of chlorosulfonic acid at about 10° C. 50 parts of bromine is added, the whole is heated within forty-five minutes to 55° to 60° C. and kept for two hours at this temperature. The product is worked up as described in Example 1. A very good yield of a yellowish red pigment dye having very good fastness properties is obtained. The dye has an average of about 1.9 atoms of bromine in the molecule.

EXAMPLE 9

The procedure of Example 5 is repeated but the whole is not heated to 55° to 60° C. but kept at 30° C. for seven hours and at room temperature for fifteen hours. A very good yield of an orange pigment dye is obtained which has very good fastness properties. The dye has an average of about 0.9 atom of bromine in the molecule.

When the dye is used as a vat dye it dyes cotton very bright orange shades having very good fastness properties.

EXAMPLE 10

25 parts of 6,14-dichloropyranthrone and 0.5 part of iodine are dissolved in 200 parts of 100% sulfuric acid at ambient temperature. The solution is precipitated using a mixture of 500 parts of ice and 300 parts of water. 50 parts of bromine is added at ambient temperature and the whole is stirred for one hour at 20° C., heated within two hours to 65° C. to 70° C., kept at this temperature for three hours and allowed to cool to ambient temperature. The precipitate is filtered and washed until neutral. A very good yield of a yellow-orange pigment dye is obtained which has very good fastness to solvents. The dye has an average of 0.3 atom of bromine in the molecule.

The procedure described in the first paragraph of Example 10 is repeated using 1 part of sulfur instead of 0.5 part of iodine. An equally good yield of a reddish orange pigment dye is obtained having equally good fastness to solvents. The dye has an average of 0.8 atom of bromine in the molecule.

EXAMPLE 11

25 parts of 6,14-dichloropyranthrone and 0.5 part of iodine are introduced into 200 parts of 96% sulfuric acid at ambient temperature. 50 parts of bromine is added and the whole is stirred for two hours at 30° C., heating within two hours to 65° to 70° C., kept for three hours at this temperature and allowed to cool to ambient temperature.

Working up is carried out by precipitation using a mixture of ice and water, filtration and washing until neutral. A good yield of a yellowish red pigment dye is obtained which has good fastness properties. The dye has an average of 0.2 atom of bromine in the molecule.

EXAMPLE 12

The procedure of Example 11 is repeated but 100% sulfuric acid is used instead of 96% sulfuric acid. An equally good yield of a yellowish orange pigment dye is obtained which has good fastness properties. The dye has an average of 0.5 atom of bromine in the molecule.

When 1 part of sulfur is used instead of 0.5 part of iodine, a reddish orange pigment dye is obtained which also has good fastness properties. The dye has an average of 0.1 atom or bromine in the molecule.

EXAMPLE 13

The procedure of Example 11 is repeated but 5% oleum is used instead of 96% sulfuric acid. A very good yield of a red pigment dye is obtained which contains an average of 1.8 atoms of bromine in the molecule.

When 15% oleum is used instead of 5% oleum and 1 part of sulfur is used instead of 0.5 part of iodine, a yellowish red pigment dye is obtained which contains an average of 2.2 atoms of bromine in the molecule.

EXAMPLE 14

(a) 133 parts of a 15% dye paste obtained according to Example 1 is worked up into a full shade paste with 64 parts of an alkyd resin modified with soy bean oil and devoid of solvent and 16 parts of bisethylhexyl phthalate on a three roll mill with six passes at 60 atmospheres gauge, by flushing.

(b) 66 parts of binder (obtained by mixing 70 parts of alkyd resin modified with soy bean oil and devoid of solvent, 17.5 parts of bis-ethylhexyl phthalate and 12.5 parts of a melamine resin devoid of solvent are ground with 30 parts of titanium dioxide (rutile and 4 parts of a colloidal silicon dioxide on a three roll mill at 60 atmospheres gauge with six passes to form a titanium dioxide paste.

(c) 0.4 part of the full shade paste obtained according to (b) are mixed and ground on disc grinding equipment. The resulting dye paste is used for applying a coating which is baked for forty-five minutes at 120° C. A deep, yellowish red coloration is obtained which has excellent fastness to weathering.

EXAMPLE 15

1 part of the full shade paste obtained according to Example 14(a) is mixed and ground on disc grinding equipment with 3 parts of a binder which has been obtained by mixing 70 parts of alkyd resin modified with soy bean oil and devoid of solvent, 17.5 parts of bisethylhexyl phthalate and 12.5 parts of a melamine resin devoid of solvent. A coating is prepared with this dye paste and it is baked for forty-five minutes at 120° C. A deep, bright red orange coloration is obtained which has very good fastness to light and overspraying.

I claim:
1. A dye having the Formula I:

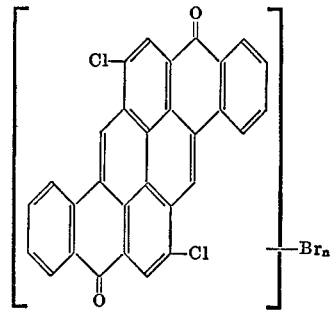

in which $n$ denotes a value of from 0.1 to 2.5 which has been obtained by brominating 6,14-dichloropyranthrone.

2. A dye according to claim 1 in which $n$ denotes a value of from 0.5 to 2.2.

References Cited

UNITED STATES PATENTS

| | | | |
|---|---|---|---|
| 1,904,145 | 4/1933 | Kunz et al. | 260—360 |
| 2,013,791 | 10/1935 | Sachs et al. | 260—360 |
| 3,673,220 | 6/1972 | Bock | 260—360 |

FOREIGN PATENTS

| | | | |
|---|---|---|---|
| 321,161 | 10/1929 | Great Britain | 260—360 |

LORRAINE A. WEINBERGER, Primary Examiner

E. J. SKELLY, Assistant Examiner

U.S. Cl. X.R.

8—4, 34; 106—23, 168, 193 P, 204; 260—37 N, 41 C

UNITED STATES PATENT OFFICE
CERTIFICATE OF CORRECTION

Patent No. 3,754,008          Dated August 21, 1973

Inventor(s) Fritz Graser

It is certified that error appears in the above-identified patent and that said Letters Patent are hereby corrected as shown below:

Column 4, line 50, "part" should read -- parts --.

Column 4, line 66, "atom" should read -- atoms --.

Signed and sealed this 29th day of October 1974.

(SEAL)
Attest:

McCOY M. GIBSON JR.           C. MARSHALL DANN
Attesting Officer          Commissioner of Patents